March 22, 1960
J. MARDON ET AL
2,929,449
FLUID FLOW DISTRIBUTION DEVICES
Filed Aug. 22, 1955
5 Sheets-Sheet 1
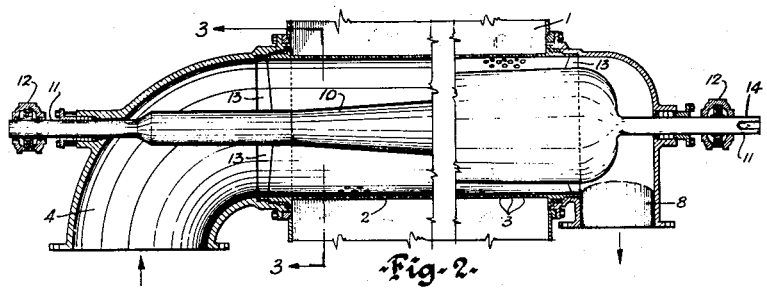
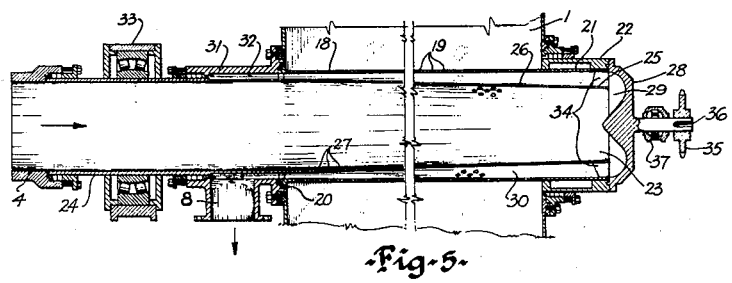
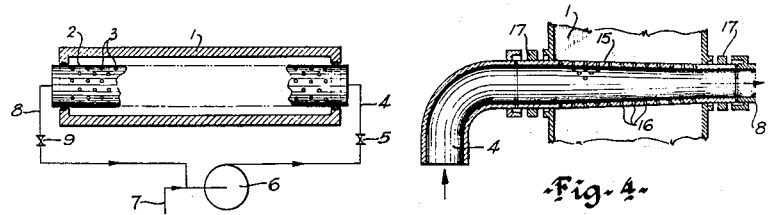
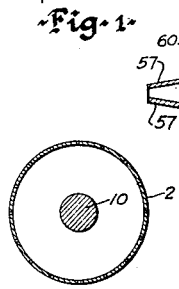
INVENTORS,
JAMES MARDON,
CHRISTOPHER I. H. NICHOLL
By Alex. E. MacRae
Attorney.

March 22, 1960 J. MARDON ET AL 2,929,449
FLUID FLOW DISTRIBUTION DEVICES
Filed Aug. 22, 1955 5 Sheets-Sheet 2

INVENTORS,
JAMES MARDON,
CHRISTOPHER I. H. NICHOLL

By Alan E. MacRae
Attorney.

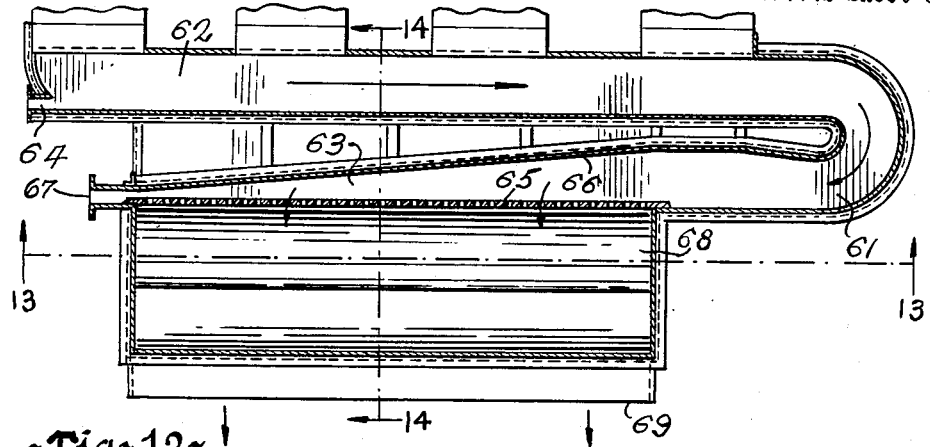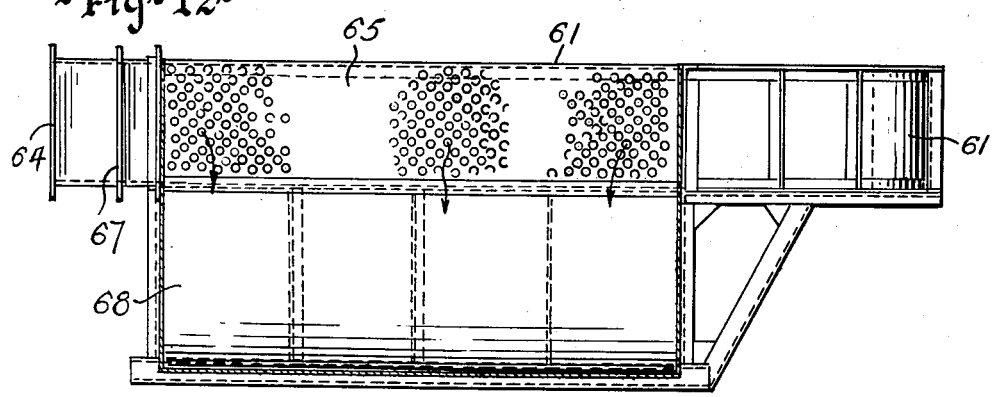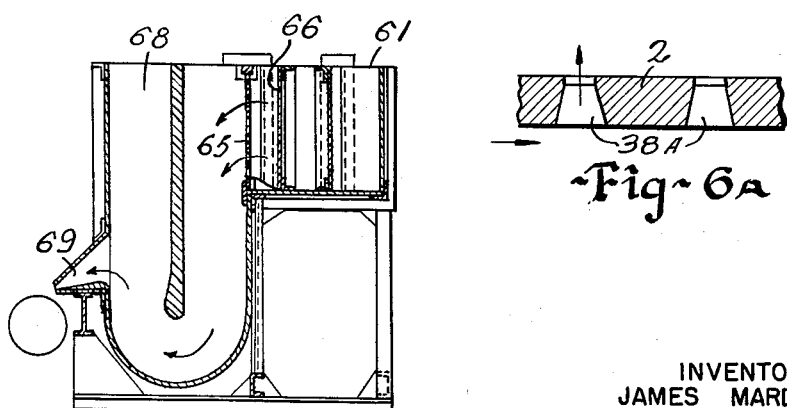

March 22, 1960  J. MARDON ET AL  2,929,449
FLUID FLOW DISTRIBUTION DEVICES
Filed Aug. 22, 1955  5 Sheets-Sheet 4
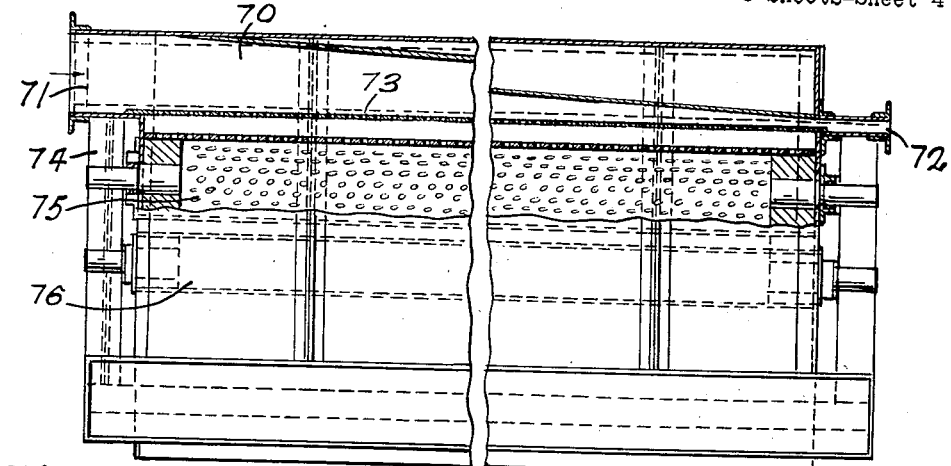
Fig-15-
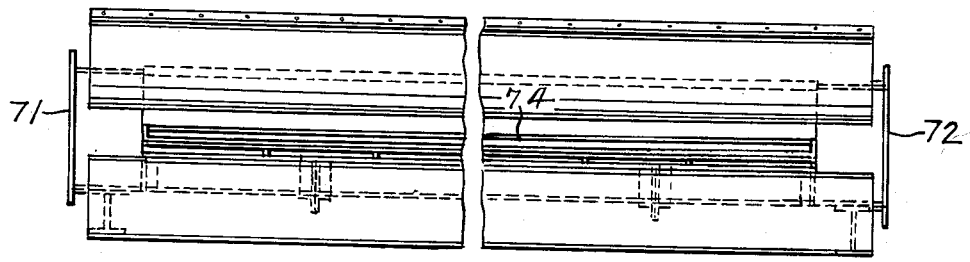
Fig-16-
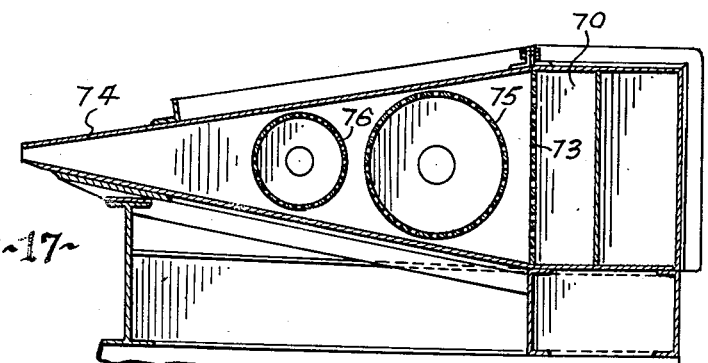
Fig-17-
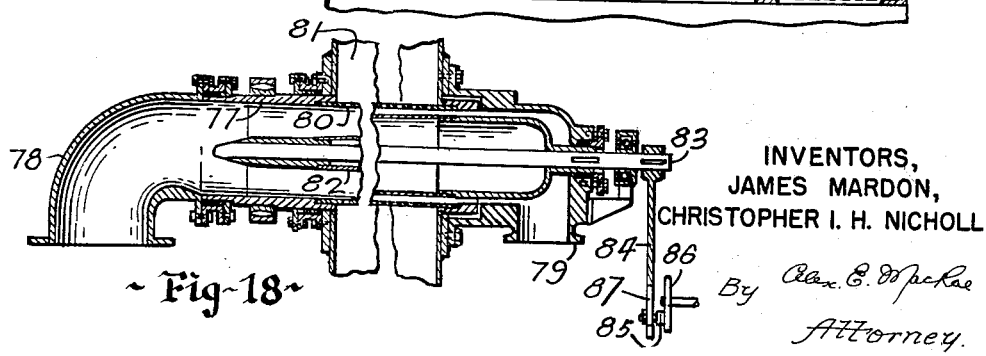
Fig-18-
INVENTORS,
JAMES MARDON,
CHRISTOPHER I. H. NICHOLL
By Alex. C. McRae
Attorney.

March 22, 1960  J. MARDON ET AL  2,929,449
FLUID FLOW DISTRIBUTION DEVICES
Filed Aug. 22, 1955  5 Sheets-Sheet 5
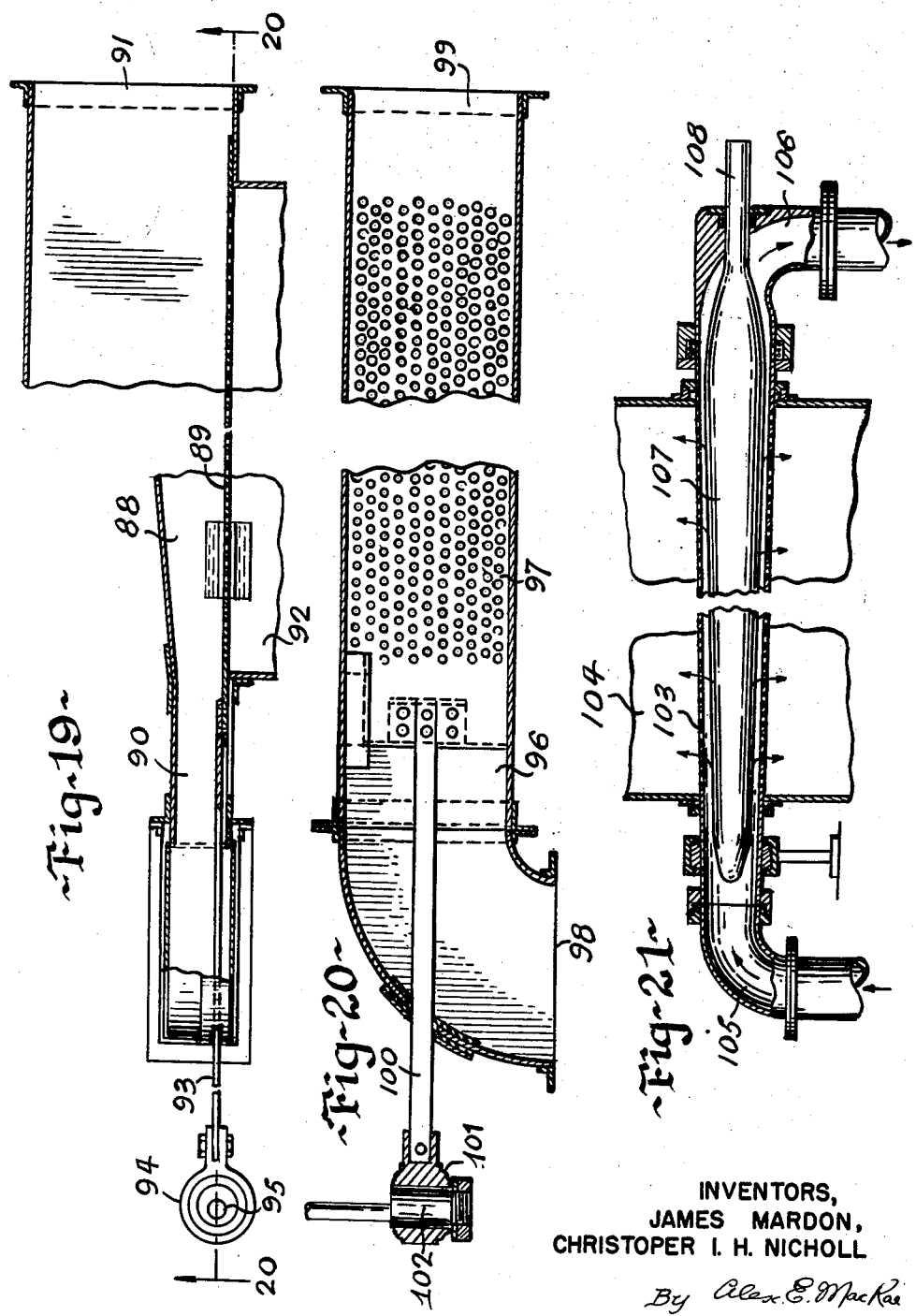
INVENTORS,
JAMES MARDON,
CHRISTOPER I. H. NICHOLL
By Alex E. MacRae
Attorney.

United States Patent Office 2,929,449
Patented Mar. 22, 1960

2,929,449

FLUID FLOW DISTRIBUTION DEVICES

James Mardon, Quebec City, Quebec, and Christopher I. H. Nicholl, Ottawa, Ontario, Canada, assignors to Anglo Paper Products, Limited, Quebec, Quebec, Canada Application August 22, 1955, Serial No. 529,696

14 Claims. (Cl. 162—337)

This invention relates to fluid flow distribution devices.

There are many practical instances where it is highly desirable, in the feeding of fluids for various purposes, to maintain an even distribution or velocity of the flowing fluid.

For instance, the problem of obtaining an even sheet of stock on the wire of a paper making machine is generally recognized to be dependent upon the evenness of the jet of stock delivered from the slice. The evenness of the jet is also well known to be dependent upon the evenness of the turbulence and shear in the stock in the head box, whether the latter be of open or closed type. It is generally agreed that the factor of major importance in obtaining a perfectly even flow of stock through the head box to the slice is the provision of a stock feed to the box which will be of maximum possible uniformity or evenness.

Various attempts have been made in the past to achieve the desirable evenness of stock feed to the head box but none of such attempts have been completely successful in providing a perfectly even feed of stock.

Furthermore, in the production of plastic films, it is frequently desirable but difficult to obtain an even distribution of the plastic composition prior to calendering or of the coating mix or surface coating.

Again, it is often of practical importance to obtain an even distribution of gases as, for instance, for combustion purposes or in the distribution of gases into a reaction space. Thus, it is desirable to provide an even gas distribution from end to end of a gas manifold in a burner, as well as an even distribution of air for combustion purposes in burners.

It is an object of this invention to provide a device for feeding fluids which will result in a substantially even flow of fluid across the feeding stream. A more specific object is to provide a device for feeding stock to a head box of a paper or board machine which will result in a substantially even flow of stock through the head box to the slice. Another object is to provide an improved design of head box, slice and stock feed device arranged to provide maximum evenness in the jet of stock delivered from the slice.

The invention broadly resides in a fluid flow device comprising a perforated member arranged to extend transversely across a vessel and dividing such vessel into two separate compartments, one of said compartments being adapted to receive an evenly distributed flow of fluid, the other of said compartments having a fluid inlet adjacent one end of the perforated member and a fluid outlet adjacent the other end of the perforated member, means for feeding fluid through said inlet along the face of the perforated member at a substantially constant velocity whereby the fluid flows through the perforated member into the first compartment at a substantially even pressure, and means for withdrawing overflow fluid through said outlet.

The invention will be described with reference to the accompanying drawings, in which Figure 1 is a sectional elevation, in partly diagrammatic form, of a stock flow device in accordance with the invention, Figure 2 is a sectional elevation of another form of stock flow device, Figure 3 is a partial cross sectional view on line 3—3 of Figure 2, Figure 4 is a sectional elevation of still another form of stock flow device, Figure 5 is a sectional elevation of a further form of stock flow device, Figures 6 and 6A are enlarged partial sectional longitudinal views of a wall of a roll showing forms of perforations therein, Figures 7 to 10, inclusive, are diagrams showing various typical applications of the flow devices of the present invention, Figure 11 is a sectional end elevation of a head box, slice, and flow device in accordance with the invention, Figure 12 is a plan view of a head box incorporating a feed device in accordance with the invention, Figure 13 is a sectional view on line 13—13 of Figure 12, Figure 14 is a cross sectional end elevation of the device shown in Figure 12, Figure 15 is a plan, partly in section, view of a modified form of head box and stock feed device, Figure 16 is a front elevation of the device shown in Figure 15, Figure 17 is a cross-sectional end elevation of the structure shown in Figure 15, and Figures 18, 19, 20 and 21 are longitudinal sectional elevations of still other forms of fluid feed devices.

For convenience of description the various forms of the device in accordance with the invention have been generally related to stock flow in head boxes of paper making machines.

Referring to Figure 1, 1 is a head box of conventional structure and 2 a hollow flow distribution roll having a multiplicity of uniformly spaced perforations 3 therein. As shown, roll 2 has its end portions rotatably journalled in the end walls of the head box and may be driven by any suitable means, not shown. Paper stock is fed into the interior of roll 2 axially through one end thereof by a pipe 4, having a valve 5 therein, and leading from a conventional fan pump 6, which is supplied with stock through pipe 7. Excess stock is led from the other end of roll 2 through pipe 8, having a valve 9 therein, and returned to the suction side of the pump 6, as shown.

Referring to Figures 2 and 3, the mounting of roll 2 in head box 1, with pipe connections 4 and 8, is shown in greater detail. Means are provided for assuring greater evenness of velocity of stock delivery from the roll to the box and comprises a longitudinally tapered plug 10 extending axially through the roll 2. Plug 10 is carried by an axial supporting shaft 11 at each end thereof, such shafts being journalled in walls of pipes 4 and 8 and supported in bearings 12. The roll 2 may be conveniently rotated by connecting it to plug 10, as by webs 13, and by providing a suitable driving element (not shown) on shaft portion 14. It will be apparent that the plug 10 is of gradually increased cross sectional area from the inlet to the outlet end of the roll to gradually confine the stock stream as it flows from the inlet to the outlet end and thus maintain its velocity which would otherwise be reduced by flow of stock out of the perforated roll. It will be apparent that the plug shape may be designed to compensate for the effect of fluid friction in order to further improve the evenness of fluid distribution. The position of the plug 10 in roll 2 may be longitudinally adjusted as required to meet varying conditions of stock flow velocity.

Figure 4 illustrates another modification of the invention wherein a longitudinally tapered roll 15, provided with a multiplicity of perforations 16, has its end portions journalled in the end walls of head box 1. Pipes 4 and 8 are connected to the ends of the roll 15 as before. The projecting end portions of the roll 15 are rotatably supported in suitable bearings 17, and means (not shown) may be provided for rotating the roll. As shown, the roll 15 gradually decreases in diameter from the inlet to the outlet end thereof to gradually confine the stock stream in the roll and maintain a substantially constant velocity of its flow through the roll and out of the perforations 16 into the head box from end to end of the roll.

Figure 5 illustrates a further modification wherein a roll 18 of constant diameter extends transversely through the head box 1. The roll is provided with a multiplicity of perforations 19 within the head box. One end of roll 18 terminates substantially at and is journalled in one side wall of the head box as indicated at 20. The other end of the roll is provided with an imperforate portion 21 extending exteriorly of the head box. A sleeve 22 mounted on portion 21 is journalled in the adjacent side wall of the head box.

A second hollow roll 23 is axially disposed with respect to roll 18 and has an imperforate end or inlet portion 24 of uniform and less diameter than that of roll 18 lying exteriorly of the head box 1, an imperforate end portion 25 terminating substantially at the adjacent end of portion 21 of roll 18, and an intermediate portion 26 having a multiplicity of perforations 27 therein lying radially opposite the perforated portion of roll 18. Portion 26 is longitudinally tapered, i.e., its diameter gradually decreases from end portion 24 to end portion 25, the latter portion being also tapered as shown.

Stock feed pipe 4 is connected to the exterior end of roll 23 as shown, to feed stock axially thereinto.

Means for directing the stock flow reversely between rolls 18 and 23, following its exit from the interior end of roll 23, comprises a cap member 28 fixed to the outer end of sleeve 22, such member 28 thereby enclosing the adjacent ends of rolls 18 and 23. As shown, member 28 has an interior annular recess 29 providing communication from the interior of roll 23 to one end of the annular space 30 between the rolls and acting to direct the stock evenly into such annular space.

The overflow stock outlet pipe 5 is connected to the other end of annular space 30 by means of a sleeve 31 mounted on the adjacent side wall of the head box and in which the portion 24 of roll 23 is journalled, sleeve 31 having an annular space 32 therein communicating with space 30 and which overflow pipe 5 communicates, as shown. A bearing support 33 for portion 24 of roll 23 may also be provided.

Rolls 18 and 23 may be connected together for simultaneous rotating movement by means of webs 34. Rotating movement may be imparted to the rolls as by means of a driving member 35 mounted on a stub shaft 36 extending axially from cap member 28. The shaft 36 may also be supported in bearings 37.

It will be apparent that as the stock flows through roll 23, a portion of it will flow through perforations 27, such flow being of even degree from end to end of perforated portion 26 by reason of the tapered character thereof. Similarly, in the reverse flow of the stock through annular space 30, a portion of the stock will flow out of the space 30 into head box 1 through perforations 19, the tapered character of space 30 resulting in an even flow of the stock into the head box from end to end of the perforated portion of roll 18.

If desired, the perforations 3, 16, 19 and 27 may be shaped to provide a direction of flow therefrom perpendicular to the axis of the respective roll. Referring to Figure 6, this may be accomplished by forming the perforation 3 in roll 2 with an angular portion 38 extending at a slight acute angle from the direction of flow inside the roll and a portion 39 extending perpendicular to the axis of the roll and leading to the exterior of the roll. Another manner of obtaining the desired flow from the holes in a direction perpendicular to the axis of the perforated member and the initial direction of flow is to taper the holes at 20° included angle with the small end in the downstream direction of flow. This is illustrated in Figure 6A wherein tapered openings 38A are provided in the roll 2.

Figure 7 illustrates, diagrammatically, one application of a stock flow device as described wherein 40 is the breast roll, 41 a head box, 42 a perforated roll structure for feeding stock into the head box and which may be in accordance with any of the modifications previously described, 43 the slice, 44 a fan pump for delivering stock from a stock box 45 to the conventional screen assembly 46 for preliminary screening of the stock, and 47 a fan pump for delivering stock from the screen assembly 46 to one end of roll 42 through the valved line 48. Overflow stock from the other end of roll 42 is led through a valved line 49 back to the fan pump 47.

Figure 7:
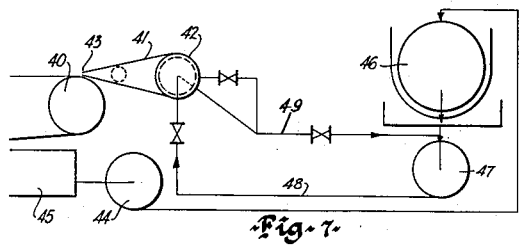
Figure 8:
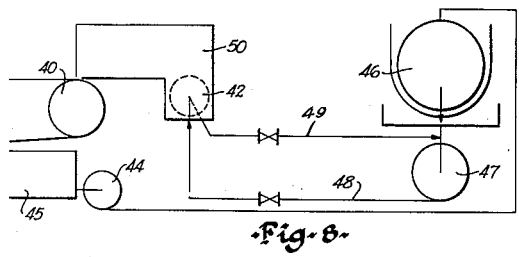
Figure 8 illustrates another typical application wherein the perforated roll structure 42 is mounted in a conventional box type closed inlet head box 50, in substitution for the usual cross flow distributor.
Figure 9:
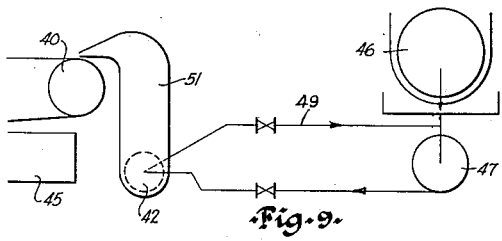
Figure 9 illustrates use of the roll structure 42 in a modern type of pressure flow nozzle head box 51.
Figure 10:
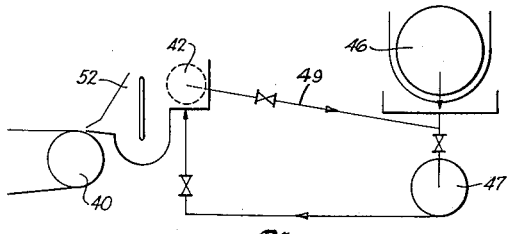
Figure 10 illustrates use of the roll structure 42 in a conventional open type head box 52.

Referring to Figure 11, a special type of head box embodying the present invention is shown wherein the box is in the form of a symmetrical nozzle 53. The rear portion 54 of the nozzle may be of hemispherical or paraboidal shape, as shown. If necessary, means may be provided for bleeding off a quantity of stock from the rear portion 54, to prevent stagnation of stock therein, as by means of one or more slits 55. The nozzle also comprises a parallel-sided portion 56, the upper and lower walls of which converge from the rear portion 54 to symmetrical nozzle lips 57 constituting the slice. A perforated roll stock delivery device 58 which may be in accordance with any of the forms shown in Figures 1 to 5, inclusive, is mounted in the rear portion 54, the overall diameter of such device being slightly smaller than the diameter of portion 54. Preferably, in order further to promote evenness of flow from slice 57, one or more (two as shown) perforated rolls 59 are mounted in converging portion 56 of the nozzle, such rolls extending between the parallel sides thereof. Each roll 59 is of slightly less diameter than the adjacent depth of the nozzle.

Further, in accordance with the invention, the nozzle 53 may be provided with boundary layer bleed-off means adjacent the lips 57 and comprises a bleed-off line 60 leading from each of the converging top and bottom walls of the nozzle. The instability of slice jets is frequently due to the boundary layer of stock therein, and the bleeding off of very small quantities of stock adjacent the slice jet reduces or eliminates disturbance or turbulence caused by the boundary layer.

In the stock flow devices, described and shown in Figures 2 to 5 inclusive, about 80% of the stock fed thereto passes out of the perforations into the head box, the remaining 20% being overflow, the pressure of the stock fed to the device by the pump being chosen accordingly. In the device shown in Figure 5, about 35% of the stock passes through perforations 27 of roll 23 and the remaining 65% passes through the space between rolls 23 and 18. As already, indicated, about 80% of the total inflow passes out of perforations 19 of roll 18 in the head box.

Referring to Figures 12, 13 and 14, the device shown comprises a U-shaped trough 61 having a parallel-sided inlet portion 62 and a tapered outlet portion 63. Portion 62 has a stock inlet 64 at the end thereof. One wall of portion 63 is constituted by a flat perforated screen or plate 65, the opposite wall 66 being inclined to provide the tapered trough portion. Portion 63 has an outlet 67 at the end thereof for stock overflow. It will be observed that portion 63 is of gradually decreasing volume in the stock flow direction towards the outlet 67 to provide an even distribution of stock flowing through the perforations in plate 65. The exterior face of plate 65 communicates with a vessel 68 which may be a head box having a slice jet 69.

Referring to Figures 15, 16 and 17, the device shown comprises a feed compartment 70 having an inlet 71 at one end and an outlet 72 at the other end, the compartment being of gradually decreasing cross-sectional area from the inlet to the outlet. One wall of the compartment is constituted by a flat perforated screen or plate 73, the exterior face of which communicates with a head box 74 of the converging flow nozzle type. The box 74 may contain perforated stock distributing rolls 75 and 76. The stock is fed through inlet 71 under pressure and consequently passes under pressure along the face of plate 73, and parallel to the longitudinal axis of the plate. The shape of the compartment 70 provides a constant velocity of stock along the face of the plate, this being facilitated by use of the overflow outlet 72 at the other end of the compartment.

While the plate 73 has been illustrated as flat, it may be concavo-convex in shape, with the convex face disposed exteriorly of the compartment 70.

Referring to Figure 18, the device comprises a tubular member 77, the ends of which are rotatably carried by inlet and outlet members 78 and 79. The major wall portion of member 77 is constituted by a tubular screen or roll 80, the exterior face of which communicates with a vessel or head box 81. A conical plug 82 is axially mounted within and fixed to the member 77. It will be observed that plug 82 is of gradually increasing cross sectional area from the inlet to the outlet end of roll 80 to gradually confine the stock stream as it flows from the inlet to the outlet end and thus maintain its velocity across the interior face of the roll 80.

Instead of continuously rotating roll 80 in one direction, means are provided for alternately revolving it a relatively short distance in opposite directions. This may be effected as shown by means of a rotatably mounted shaft 83 which extends axially through plug 82 and is keyed thereto. A lever 84 is keyed to the outer end of shaft 83 and is swung back and forth by means of a roller 85 eccentrically mounted on a disc 86, which is revolved in any suitable manner. Roller 85 traverses the wall of an opening 87 in lever 84.

It will be apparent that movement of the perforated plate, screen or roll in any of the embodiments hereinbefore described is desirable in order to avoid the sticking of fibers to the solid regions between the holes (which would result in the later breaking away of such fibers to form flocs), and to create incoherent conditions of turbulence so that a persisting coalescence pattern of the jets from the plate or roll does not have a deleterious effect.

Figure 19 illustrates a tapered feed compartment 88 having a flat perforated plate 89 constituting one wall thereof. The compartment has an inlet 90 at one end and an overflow outlet 91 at the other end. The exterior face of plate 89 communicates with a vessel 92 arranged to receive the distributed fluid. Means for imparting oscillating movement to plate 89 comprises a rod 93 fixed to the plate and provided at its outer end with a ring 94 adapted to be interiorly traversed by an eccentrically mounted revolving pin 95.

Figure 20 illustrates a feed compartment 96 having a fluid distributing flat perforated plate 97 therein. The compartment has an inlet 98 and an overflow outlet 99. Means for imparting oscillating movement to the plate 97 comprises a rod 100 fixed to one end of the plate. A bearing 101 is mounted on the outer end of the rod, and a rotatable eccentric 102 is journalled in the bearing.

Referring to Figure 21, a modified form of fluid distributing device is illustrated wherein a roll 103 extends transversely through a vessel such as a head box 104. The roll is of gradually increasing diameter from end to end and its major portion within the vessel 104 is of perforate form, as shown. The smaller end of roll 103 communicates with an inlet member 105 and the larger end with an outlet member 106. A tapered plug 107 is axially mounted within the roll and extends beyond the ends of the perforate portion. The plug 107 has a slightly greater degree of taper than that of the roll whereby the annular passage for stock flow between the plug and roll is of gradually decreasing cross-sectional area. The plug and roll are rotatably mounted for rotation by means of the axial shaft 108.

It will be apparent that the divergence of the roll from the feed to the outlet end is compensated for by the shape of the plug which is such as to maintain an even velocity along the face of the roll and at the same time counteracts the tendency of the fluid to diverge from a direction perpendicular to that of the original feed.

It has been found that convergence of the fluid stream as it flows along the perforated member is effective in straightening out a considerable divergence from the desired direction of fluid flow from the perforated distributing member.

Figure 6:
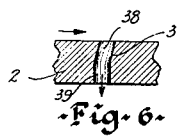

In each of the various modifications described and illustrated, a flow of fluid substantially perpendicular to the axis of the perforated member is provided. In the case of the use of tapered holes, such as shown in Figure 6A, an absolutely perpendicular flow is obtained.

This application is a continuation-in-part, of application Serial No. 465,389, filed October 28, 1954, now abandoned.

We claim:

1. A fluid distributing device for delivering an even flow of fluid across the width of a vessel comprising, in combination with a vessel having terminal side walls, a wall forming a compartment extending transversely of said vessel from one to the other of said side walls and terminating at said side walls, said compartment defining a fluid passage and having a fluid inlet at one end thereof and a fluid outlet at the other end thereof, said inlet and outlet being exteriorly of said vessel, said inlet having a cross-sectional area substantially equal to that of said compartment at said one end thereof, said outlet having a cross-sectional area substantially equal to that of said compartment at said other end thereof, means for feeding fluid under pressure through said inlet into said compartment to produce a flow of fluid therein in a direction transversely of said vessel, said transverse wall having therein a multiplicity of perforations substantially uniformly distributed throughout its extent from one to the other of said side walls to receive and direct angularly of said direction of flow, a major portion of fluid from said flow through said perforations into said vessel, and means for withdrawing overflow fluid through said outlet, said outlet being constantly open for continuous passage therethrough of the remaining minor portion of said flow for complete removal from said vessel of said overflow fluid to avoid stagnation areas and localized pressures in said flow at said other end of said compartment, said compartment being of gradually restricted cross-sectional area throughout substantially its entire length from said inlet to said outlet to compensate for exit of fluid through said perforated wall, said gradually restricted cross-sectional area of said compartment and said constantly open outlet thereby maintaining substantially constant velocity in fluid flow through said perforated wall from end to end thereof.

2. A fluid distributing device as defined in claim 1, each said perforation having a downstream wall surface extending at an acute angle from the adjacent upstream face of said wall in said compartment and a portion extending perpendicularly from said angular wall surface to the face of said wall in said vessel.

3. A fluid distributing device as defined in claim 1, each said perforation having a portion of gradually decreasing cross-sectional area extending from the face of said wall in said compartment.

4. A fluid distributing device as defined in claim 3, the included angle of the wall surfaces of said perforated portion being approximately 20°.

5. A fluid distributing device as defined in claim 1, said perforated wall comprising a hollow roll, the interior of said roll constituting said compartment.

6. A fluid distributing device as defined in claim 1, including means rotatably mounting said perforated transverse wall.

7. A fluid distributing device as defined in claim 1, said perforated wall comprising a hollow roll, the interior of said roll constituting said compartment, and means rotatably mounting said roll.

8. A fluid distributing device as defined in claim 1, said perforated wall comprising a flat plate, and means for imparting oscillating movement to said plate.

9. A device for feeding an evenly distributed flow of fluid to a vessel which comprises a hollow roll extending transversely through said vessel, the portion of said roll within the vessel having therein a multiplicity of perforations substantially uniformly distributed throughout the entire extent of said portion, a fluid inlet communicating with the interior of said roll through one end thereof, and a constantly open fluid outlet leading from the other end of the roll, a tapered plug extending axially through said perforated roll in spaced relation thereto to provide a space within said roll constituting a compartment receiving fluid from said inlet for distribution of fluid through said perforate portion into said vessel, said outlet permitting discharge of overflow fluid from said compartment, said compartment being of gradually decreasing cross-sectional area throughout substantially its entire length from said inlet to said outlet to compensate for exit of fluid through said perforate portion and substantially maintain constant velocity in fluid flow through said perforate portion from end to end thereof.

10. A device for feeding an evenly distributed flow of fluid to a vessel which comprises a tapered hollow roll extending transversely through said vessel, the portion of said roll within said vessel being perforate, a fluid inlet communicating with the interior of the roll through one end thereof, a fluid outlet leading from the other end of the roll, said roll being of gradually decreasing diameter from the inlet to the outlet end thereof, and a tapered plug extending axially through said perforate roll portion in spaced relation thereto, said plug having a greater degree of taper than that of said roll to provide an annular fluid flow space therebetween of gradually decreasing cross-sectional area from the inlet to the outlet end thereof.

11. In a paper machine head box, a stock flow device comprising a roll extending transversely through said head box and having its end portions rotatably mounted in the side walls of said head box, said roll being hollow to provide a stock flow space therethrough and having a multiplicity of perforations therein for stock exit therefrom into said head box, a stock inlet pipe communicating with said stock flow space through one end thereof, a stock outlet pipe leading from the other end of said roll, a pump for feeding stock under pressure and at a substantially constant velocity through said inlet pipe to said stock flow space and for withdrawing stock through said outlet pipe, said roll being of gradually decreasing diameter from the inlet to the outlet end thereof to gradually reduce the cross-sectional area of said stock flow space to compensate for exit of stock through said perforations and substantially maintain said constant velocity of stock flow through said roll.

12. In a paper machine head box, a stock flow device comprising a hollow roll of constant diameter extending transversely through said head box and having its end portions rotatably mounted in the side walls of said head box said roll having its portion within the head box provided with a pultiplicity of perforations for stock exit therefrom into the head box, a second hollow roll extending axially through said first roll in spaced relation thereto, a stock inlet pipe communicating with the interior of said second roll through one end thereof, said second roll having a perforated portion lying radially opposite the perforated portion of said first roll, said perforated portion of the second roll being of gradually decreasing diameter from said one end thereof, means at the other end of said second roll providing communication from the interior thereof to the space between said rolls, and a stock outlet pipe leading from the space between said rolls adjacent said one end of the second roll.

13. A stock flow device as defined in claim 12, including means connecting said second roll with said first roll for rotation therewith.

14. A device for feeding an evenly distributed flow of fluid to a vessel which comprises a hollow roll extending transversely through said vessel and having its end portions rotatably mounted in the side walls of said vessel, said roll defining a fluid passage extending longitudinally through said roll from end to end thereof, a fluid inlet pipe communicating with the interior of said roll through one end thereof, a fluid outlet pipe leading from the other end of said roll to the exterior of said vessel, a pump having its intake connected to said outlet pipe and its discharge connected to said inlet pipe to feed fluid under pressure longitudinally through said passage, said roll having therein a multiplicity of perforations substantially uniformly distributed throughout its extent from the inlet end to the outlet end thereof to permi exit of fluid through said perforations into said vessel during flow of fluid through said passage, said passage being of gradually restricted cross-sectional area throughout substantially its entire length from the inlet end to the outlet end thereof to compensate for exit of fluid through said perforations and substantially maintain constant velocity in fluid flow longitudinally through said passage.

References Cited in the file of this patent

UNITED STATES PATENTS

| | | |
|---|---|---|
| 153,406 | Vaders | July 21, 1874 |
| 325,165 | Fletcher | Aug. 26, 1885 |
| 1,241,032 | Schneider | Sept. 25, 1917 |
| 1,411,224 | Roberts | Mar. 28, 1922 |
| 1,880,688 | Berry | Oct. 4, 1932 |
| 1,889,819 | Berry | Dec. 6, 1932 |
| 1,993,214 | Hass | Mar. 5, 1935 |
| 2,334,612 | Davis | Nov. 16, 1943 |
| 2,342,050 | Hurst | Feb. 15, 1944 |
| 2,344,281 | Berry et al. | Mar. 14, 1944 |
| 2,344,282 | Berry et al. | Mar. 14, 1944 |
| 2,347,717 | Staege | May 2, 1944 |
| 2,347,850 | Staege | May 2, 1944 |
| 2,550,552 | Goodwillie | Apr. 24, 1951 |
| 2,566,449 | Hornbostel | Sept. 4, 1951 |
| 2,619,011 | Staege | Nov. 25, 1952 |
| 2,728,271 | Witworth et al. | Dec. 27, 1955 |
| 2,755,851 | Dow et al. | July 24, 1956 |

FOREIGN PATENTS

| | | |
|---|---|---|
| 504,342 | Belgium | July 14, 1951 |
| 842,302 | Germany | June 26, 1952 |